United States Patent
Ashurkoff et al.

(10) Patent No.: US 9,472,117 B2
(45) Date of Patent: Oct. 18, 2016

(54) SYSTEM WITH MODULAR COMPONENTS FOR TEACHING SHEET MUSIC TO VISUALLY IMPAIRED STUDENTS

(71) Applicants: Marina Ashurkoff, Ashburn, VA (US); Ananth Ramani, Ashburn, VA (US); Rohit Veligeti, Ashburn, VA (US); Neo Wong, Ashburn, VA (US)

(72) Inventors: Marina Ashurkoff, Ashburn, VA (US); Ananth Ramani, Ashburn, VA (US); Rohit Veligeti, Ashburn, VA (US); Neo Wong, Ashburn, VA (US)

(73) Assignee: Marina Ashurkoff, Ashburn, VA (US)

( * ) Notice: Subject to any disclaimer, the term of this patent is extended or adjusted under 35 U.S.C. 154(b) by 0 days.

(21) Appl. No.: 15/058,076

(22) Filed: Mar. 1, 2016

(65) Prior Publication Data

US 2016/0253916 A1   Sep. 1, 2016

Related U.S. Application Data

(60) Provisional application No. 62/126,646, filed on Mar. 1, 2015.

(51) Int. Cl.
*G09B 15/02* (2006.01)
*G09B 21/00* (2006.01)

(52) U.S. Cl.
CPC ........... *G09B 15/026* (2013.01); *G09B 21/004* (2013.01)

(58) Field of Classification Search
CPC .............................. G09B 15/02; G09B 15/026
See application file for complete search history.

(56) References Cited

U.S. PATENT DOCUMENTS

| | | | | |
|---|---|---|---|---|
| 1,353,486 A * | 9/1920 | McOuat | ............... | G09B 15/026 84/471 R |
| 1,412,587 A * | 4/1922 | Willoughby | ......... | G09B 15/026 84/471 R |
| 1,666,382 A * | 4/1928 | Hoffmeister | ........... | G09B 15/02 84/471 R |
| 1,724,904 A * | 8/1929 | Buxton | .................. | G09B 15/02 84/471 R |
| 1,879,002 A * | 9/1932 | Alles | ...................... | G09B 15/02 248/206.5 |
| 2,063,269 A * | 12/1936 | Randolph | .............. | G09B 15/02 84/471 R |
| 2,072,511 A * | 3/1937 | Ross | ...................... | G09B 15/02 446/75 |
| 2,298,081 A * | 10/1942 | Cohen | ..................... | B41M 3/04 273/148 A |

(Continued)

OTHER PUBLICATIONS

McPherson, Tom, Rhythmic Notation in Lego Nov. 9, 2016, viewed by the examiner on Jul. 6, 2016 at http://tommcpherson.ca/rhythmic-notation-in-lego/.*

(Continued)

*Primary Examiner* — Robert W Horn
(74) *Attorney, Agent, or Firm* — Master IP Services

(57) ABSTRACT

A system for representing music to visually impaired students includes a board having a plurality of protrusions; a plurality of modular blocks each having at least one protrusion; a plurality of music staff lines, formed by a set of the plurality of blocks, affixed to the board via the plurality of protrusions on the board; and at least one note block affixed to at least one staff line or to the board via protrusions of the at least one staff line or the protrusions of the board.

9 Claims, 13 Drawing Sheets

(56) References Cited

U.S. PATENT DOCUMENTS

| | | | | |
|---|---|---|---|---|
| 2,864,275 A | * | 12/1958 | Fraleigh | G09B 15/02 40/621 |
| 3,530,758 A | | 9/1970 | Stillo | |
| 3,715,951 A | * | 2/1973 | Lanaro | G10G 1/00 84/470 R |
| 3,733,957 A | * | 5/1973 | Peirano | G10G 1/00 84/471 R |
| 4,464,971 A | | 8/1984 | Dean | |
| 6,086,378 A | * | 7/2000 | Johnson | G09B 15/026 273/236 |
| 6,525,252 B1 | | 2/2003 | Klausen | |
| 6,967,274 B2 | * | 11/2005 | Hanington | G09B 15/02 84/470 R |
| D583,415 S | * | 12/2008 | Porter | D19/113 |
| 7,482,524 B1 | * | 1/2009 | Hanington | G09B 15/02 84/470 R |
| 7,985,913 B2 | | 7/2011 | Machell | |
| 8,759,656 B1 | * | 6/2014 | Kumar | G09B 15/00 84/470 R |
| 2013/0130589 A1 | | 5/2013 | Cobb | |

OTHER PUBLICATIONS

Klem, Rachel, "Lego of" Tradtional Lessons on Rhythmic Notation, © 2012, The School at Columbia University. viewed by the examiner at https://teach21.theschool.columbia.edu/content/lego-traditional-lessons-rhythmic-notation on Jun. 17, 2016.*

* cited by examiner

SYSTEM WITH MODULAR COMPONENTS FOR TEACHING SHEET MUSIC TO VISUALLY IMPAIRED STUDENTS

FIELD OF INVENTION

The present invention relates to music teaching devices, and more particularly, to music teaching systems with modular components for teaching music to visually impaired students.

BACKGROUND

Sheet music is a visual representation of music notes, note values, clef, time signatures, and key signatures. Sheet music is typically used by musicians to learn and perform music with voice and/or an instrument, such as a piano, violin, wind instrument, guitar, or other instrument. Novice students typically use sheet music to learn the fundamental concepts of music.

Visually impaired students have conventionally used systems relying on braille to learn music and music fundamentals. However, the use of braille in the music domain is complex and difficult for both the student and teacher. Further, the use of braille requires that the teacher be adept with braille, thereby severely limiting the number of teachers available to teach music to visually impaired students who are interested in learning music.

Other conventional devices for teaching music to visually impaired students may include pieces that attach magnetically to a board. However, the board and pieces require a specialized manufacturing process, and the pieces when attached to the board are often insecure and are easily dislodged when the pieces are physically touched by visually impaired students.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Aspects of the present invention include a system to teach music to visually impaired students. The system includes modular components that are assembled in a manner to represent sheet music. The modular components include physical features that permit a visually impaired student to interpret sheet music in a tactile and easily understood manner. Further, no knowledge of braille is required to teach music to the visually impaired students (also referred to as "students") using the systems of the present invention.

As described in greater detail herein, a music teacher (also referred to as a "teacher") can assemble a music field (e.g., representing sheet music) and configure the modular components from the system. Critically, the system provides a repeatable method for teaching music fundamentals that reinforces key concepts without the need for visual acuity or knowledge of musical braille notations.

Figure 1:
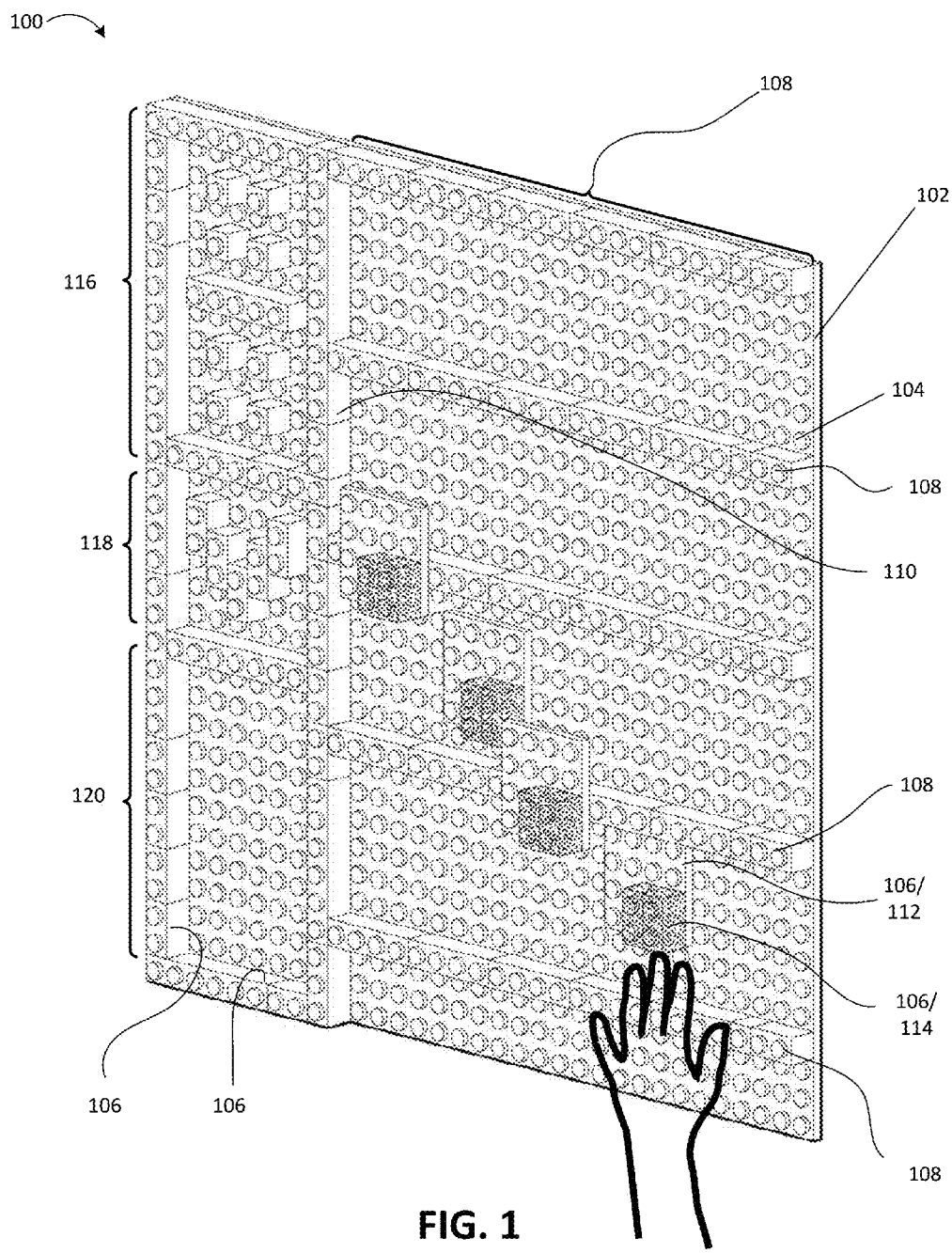
FIG. 1 shows a perspective view of a preferred embodiment of the invention.

FIG. 1 shows a perspective view of a preferred embodiment of the invention. As shown in FIG. 1, a modular music teaching system 100 includes a board 102. The board 102 includes a series of protrusions 104 by which modular blocks 106 can be affixed. For example, the modular blocks 106 include recesses 202 on the underside that attach to the protrusions (e.g., as further described in greater detail below with respect to FIG. 4B). The modular blocks 106 are in various sizes (e.g., lengths and widths). The modular blocks 106 can be affixed onto the board 102 in order to form a three-dimensional (3D) representation of sheet music that is tactile and easily interpretable by a visually impaired student. For example, as shown in FIG. 1, the modular blocks 106 can be affixed to the board 102 to form a 3D representation of a music staff with musical notes, time signature, clef, and key signature. In embodiments, the protrusions 104 may be equally spaced and may be circular in shape.

In the example shown of FIG. 1, modular blocks 106 are attachable to the board 102 to form staff lines 108, a time signature region 116, a clef region 118, and a key signature region 120. Within the clef signature region 118, additional modular blocks 106 can be affixed to the board 102 in an arrangement to form a 3D representation of a clef (additional details of which are provided in greater detail with respect to FIG. 10). Within the key signature region 120, additional modular blocks 106 can be affixed to the board 102 in an arrangement to form a 3D representation of a key signature (additional details of which are provided in greater detail with respect to FIG. 10). Within the time signature region 116, additional modular blocks 106 can be affixed to the board 102 in an arrangement to form a 3D representation of a key signature (additional details of which are provided in greater detail with respect to FIG. 8). As described herein, modular blocks 106 are also used to represent notes on the staff lines 108 and note values (e.g., quarter note, half note, whole note).

As further shown in FIG. 1, modular blocks 106/112 (hereinafter referred to as note blocks 112) are attachable to staff lines 108. Modular blocks 106/114 (hereinafter referred to as value blocks 114) are attachable to the top of the note blocks 112 to indicate whether the a note block 112 represents a quarter note, half note, whole note, or other note value (e.g., $\frac{1}{16}^{th}$ note, $\frac{1}{8}^{th}$ note, etc.). As described herein, the note blocks 112 with value blocks 114 are attachable to the staff lines 108 in a way to represent a song. In this way, the modular blocks 106 can be attached to form a 3D representation of sheet music. Visually impaired students can be easily taught how to interpret the 3D representation in order to read sheet music. For example, the space between modular blocks 106 and the protrusions 104 create physical features that are easy to decipher for a visually impaired student. Physically touching the modular music teaching system 100 allows a visually impaired student to interpret the space between modular blocks 106 and/or the protrusions 104, thereby allowing the visually impaired student to interpret the music represented by the modular music teaching system 100.

As further shown in FIG. 1, a student can physically touch the modular blocks 106 to interpret the pitch and value of musical notes, as well as the clef, timing signature, and key signature. For example, the student can physically touch the modular blocks 106 in the time signature section 116, the clef section 118, and the key signature section 120 to interpret a base clef, a timing signature, and a series of notes and their respective note values. In the example shown, the student can interpret, via touching, that the note that is currently being touched is a quarter note in between the first and second staff lines.

The modular blocks 106 are attachable in a secure manner such the modular blocks 106 do not become displaced or detached unintentionally as the student physically interacts with the modular music teaching system 100. Further, the modular blocks 106 are secure in a way that allows the student to interact with the modular music teaching system 100 with either one-hand or two-hand operation, without the modular blocks 106 becoming unintentionally displaced from each other or the board 102. This creates a seamless and productive learning experience for the student.

Figure 2:
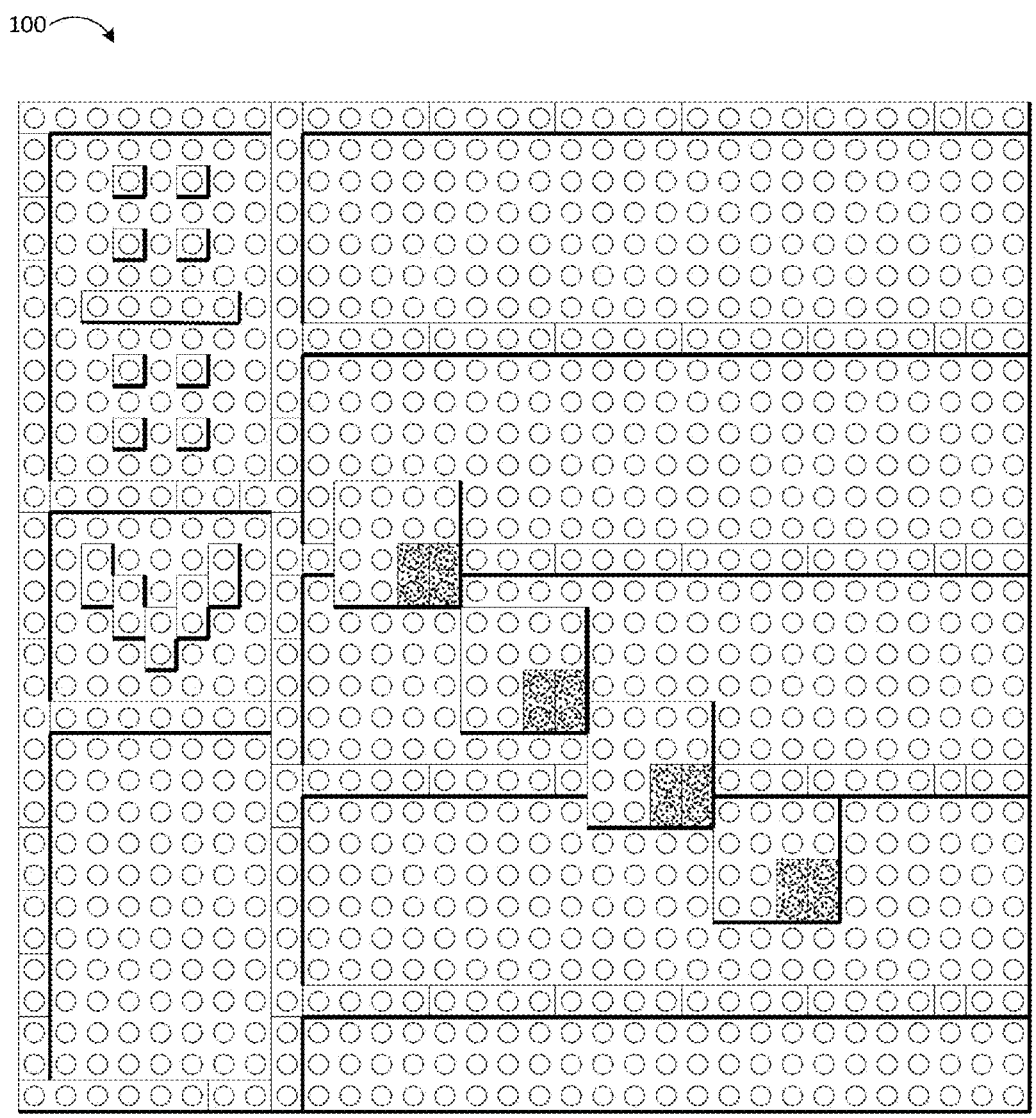
FIG. 2 shows a plane view of the modular music teaching system in accordance with aspects of the present invention.
Figure 3:
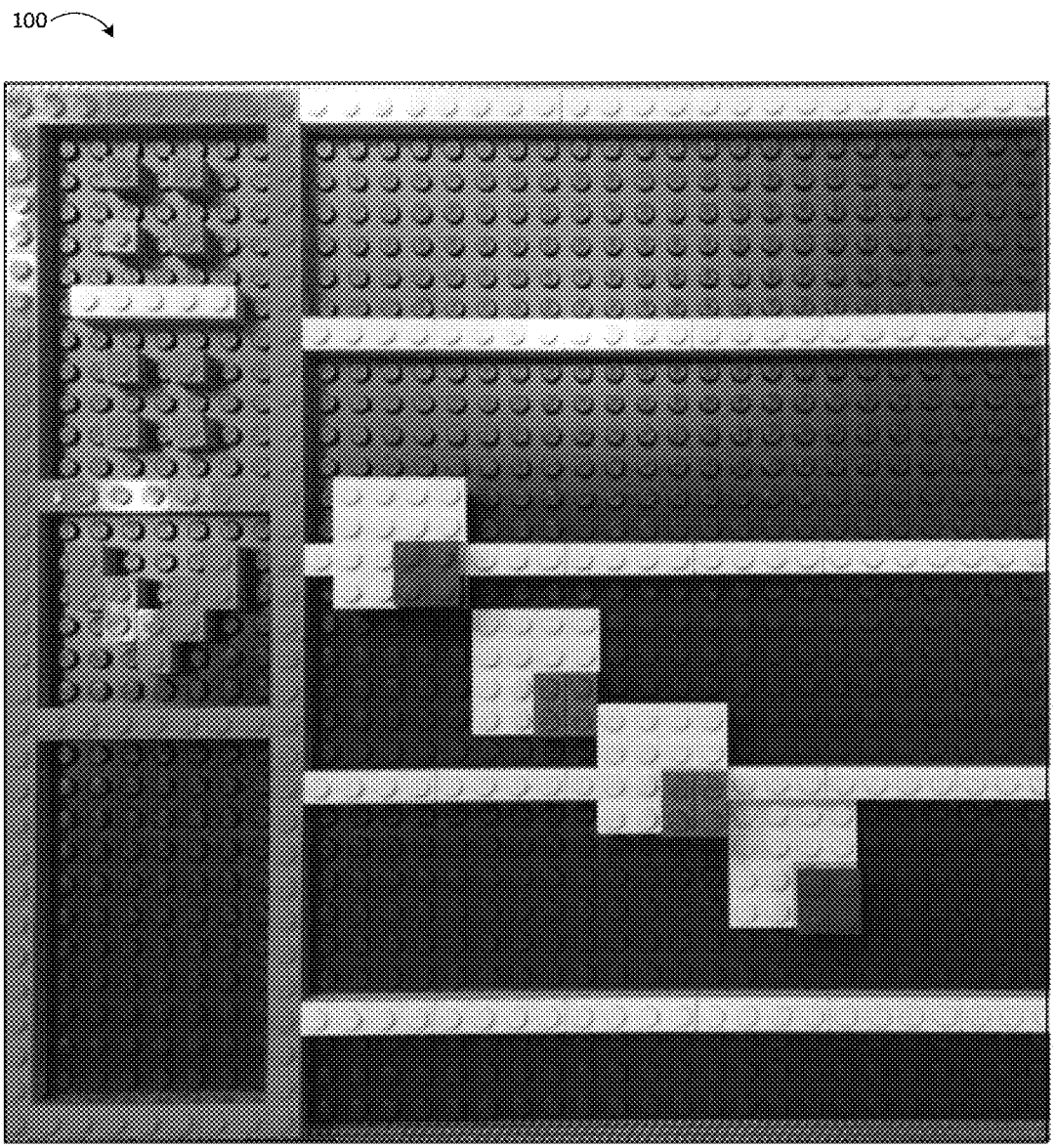
FIG. 3 shows a photograph of a plane view of the modular music teaching system in accordance with aspects of the present invention.

FIG. 2 shows a plane view of the modular music teaching system 100 in accordance with aspects of the present invention. FIG. 3 shows a photograph of a plane view of the modular music teaching system 100 in accordance with aspects of the present invention.

Figure 4A:
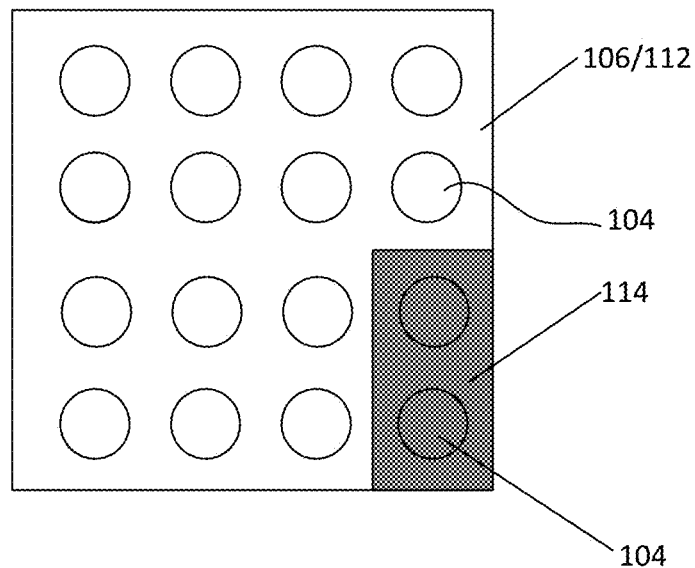
FIG. 4A shows a plane view a note block.

FIG. 4A shows a plane view a note block 112. As shown in FIG. 4A, the note block 112 may be 4×4 in size (in which there are 4 protrusions 104 in both width and height). A value block may be 1×2 in which there is 1 protrusion in width and 2 in height. A single value block 114 may represent a note value of $1/8^{th}$, although embodiments of the invention are not so limited. For example, a value block 114 may be 1×1 in which the value block 114 represents a $1/16^{th}$ note value. The value block 114 may be attached to the top of the note block 112 to indicate that the note block 112 is a $1/8^{th}$ note. As described in greater detail below, additional value blocks 114 may be attached to the note block 112 to represent a quarter note, half note, or whole note.

Figure 4B:
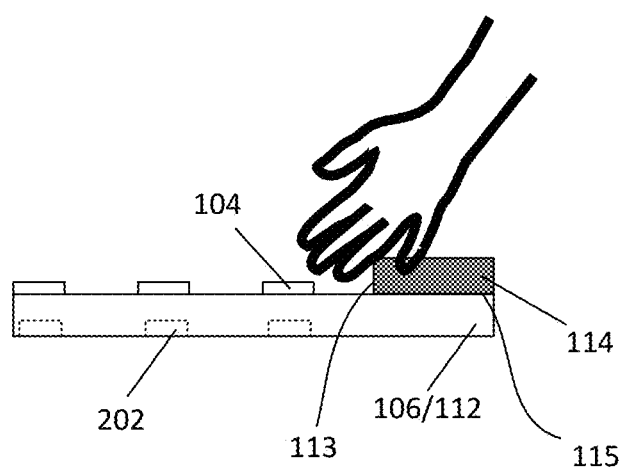
FIG. 4B shows a side view of a note block.

FIG. 4B shows a side view of a note block 112. As shown in FIG. 4B, attachment of the value block 114 creates a depth. A student can feel the depth and an edge 113 of the value block 114 in order to interpret how many value blocks 114 are on the note block 112. Further, the student can feel the number of protrusions 104 between the edge of the note block 112 and the value block 114 to determine the number and position of value blocks 114, and hence, determine the value represented by the note of the note block 112. Also, the student can feel an indentation 115 within an interface between the value block 114 and the note block 112 to determine that a value block 114 is present. As further shown in FIG. 4B, an underside of the note block 112 may include recesses from which other modular blocks 106 can be attached via the protrusions 104.

Figure 5:
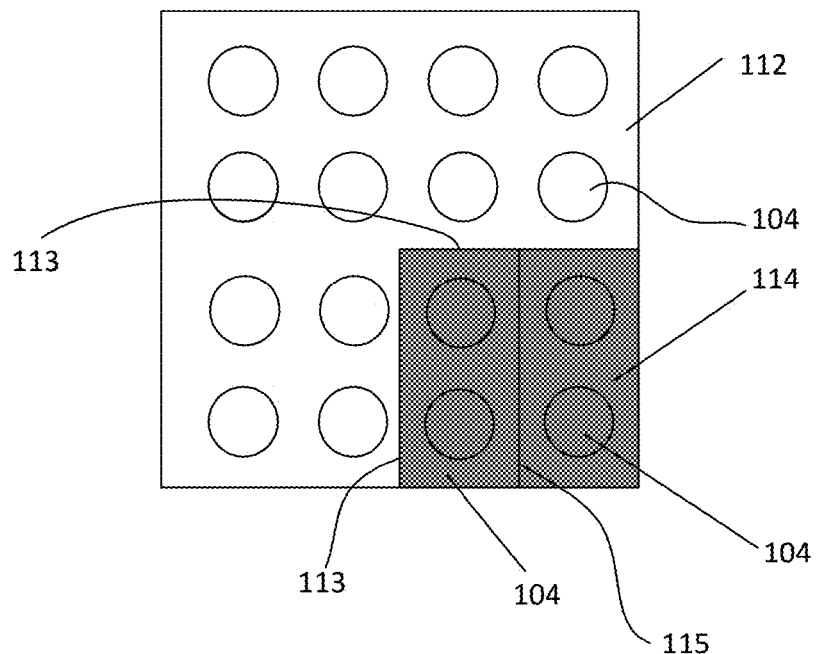
FIG. 5 shows a plane view a note block with a quarter note value.

FIG. 5 shows a plane view a note block 112 with a quarter note value. As shown in FIG. 5, two separate value blocks 114 are attached to the note block 112 to represent a quarter note. The student is able to determine, via physically touching the note block 112, that two value blocks 114 are present (e.g., based on the edges 113 creating a depth in a similar manner as described in FIG. 4B). Also, two indentations 115 can be felt to decipher the presence of two value blocks 114.

Figure 6:
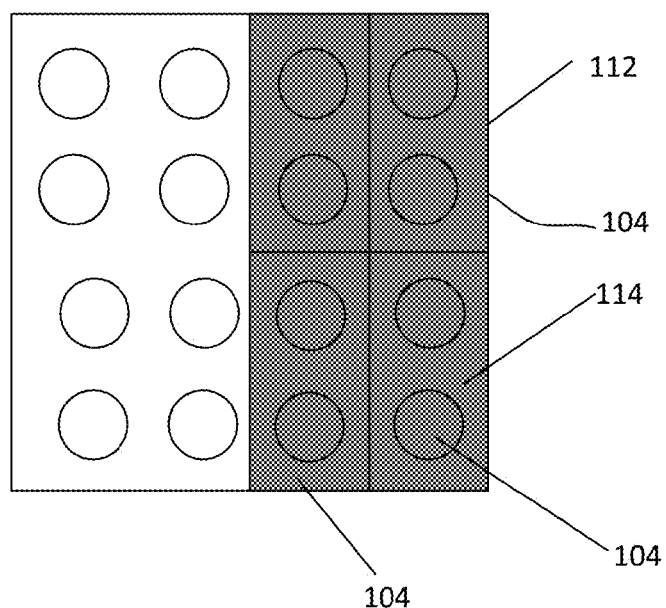
FIG. 6 shows a plane view a note block with a half note value.

FIG. 6 shows a plane view a note block 112 with a half note value. As shown in FIG. 6, four separate value blocks 114 are attached to the note block 112 to represent a half note. The student is able to determine, via physically touching the note block 112, that four value blocks 114 are present (e.g., based on the indentations 115 and the edges 113 creating a depth in a similar manner as described above with respect to FIG. 4B).

Figure 7:
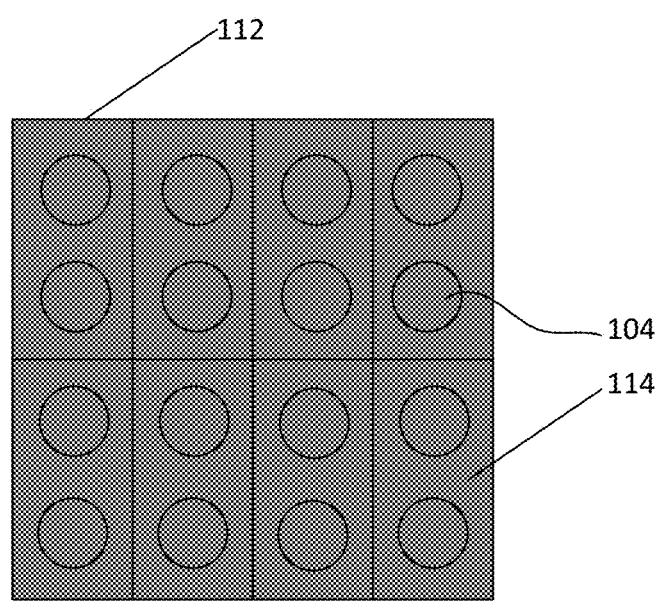
FIG. 7 shows a plane view a note block 112 with a whole note value.

FIG. 7 shows a plane view a note block 112 with a whole note value. As shown in FIG. 7, eight separate value blocks 114 are attached to the note block 112 to represent a whole note. The student is able to determine, via physically touching the note block 112, that eight value blocks 114 are present based on the indentations 115 that are detectable by touch on both the top of the note block 112 and on the sides of the note block 112 (e.g., in a similar manner as described above with respect to FIG. 4B).

Figure 8:
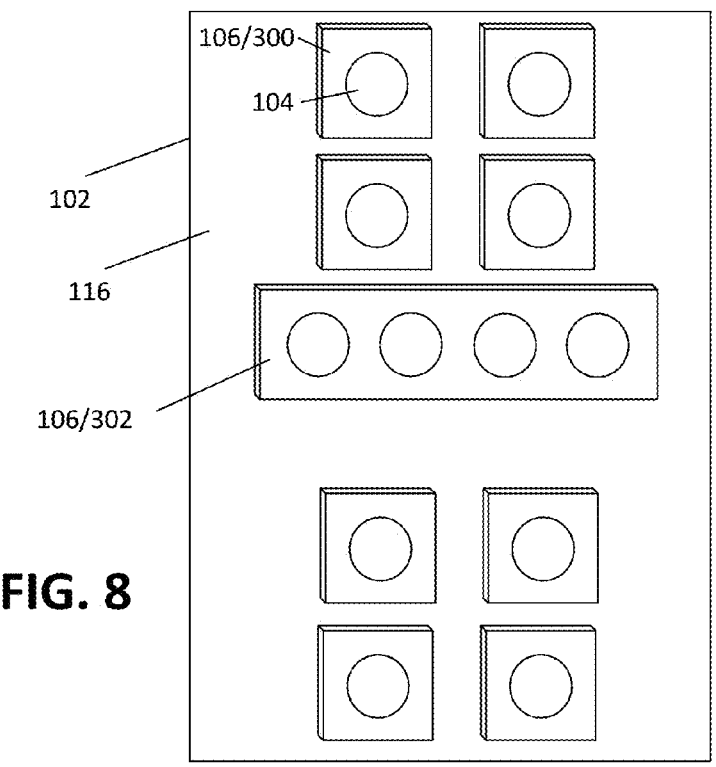
FIG. 8 shows a plane view of a representation of a 4/4 time signature.

FIG. 8 shows a plane view of a representation of a 4/4 time signature. As shown in FIG. 8, modular blocks 106 is arranged within the time signature section 116 of the board 102 to form a representation of a time signature. For clarity, the protrusions 104 are not shown on board 102 in FIG. 8. In the example of FIG. 8, a 4/4 time signature is represented by arranging four modular blocks 106 (e.g., 1×1 modular blocks 300) above a divider modular block 302, and an additional four 1×1 modular blocks 300 under the divider modular block 302. The student is able to decipher the time signature based on the number of 1×1 modular blocks 300 above and below the divider modular block 302. The student is able to determine the number of 1×1 modular blocks 300 based on the depth created by the presence of the 1×1 modular blocks 300 between the 1×1 modular blocks 300 and the board 102. In various embodiments, the divider modular block 302 may be a different size than what is shown and have a different number of protrusions 104.

Figure 9:
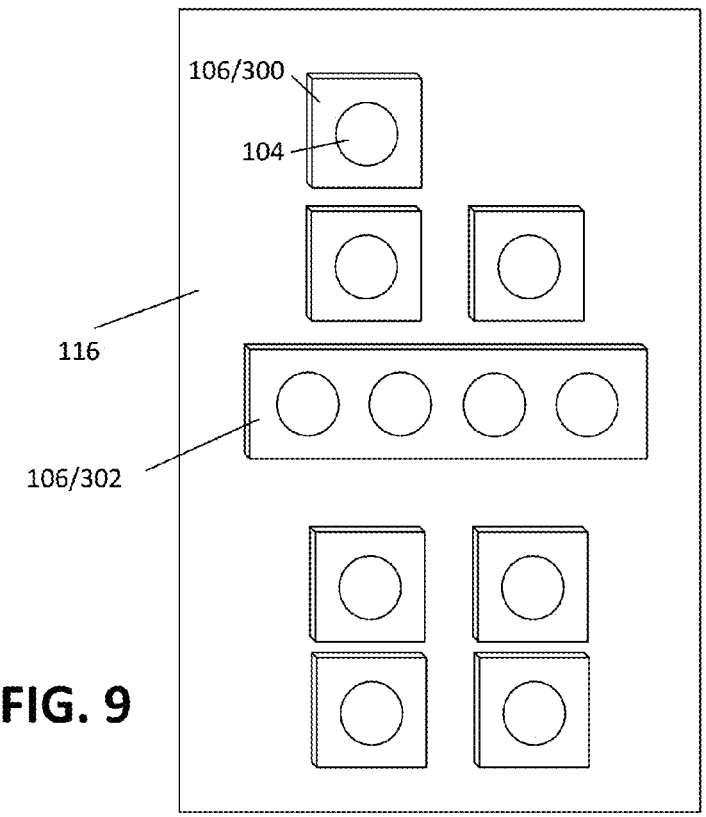
FIG. 9 shows a plane view of a representation of a 3/4 time signature.

FIG. 9 shows a plane view of a representation of a ¾ time signature. As shown in FIG. 9, a ¾ time signature is represented by arranging three 1×1 modular blocks 300 above a divider modular block 302, and an additional four 1×1 modular blocks 300 under the divider modular block 302.

Figure 10:
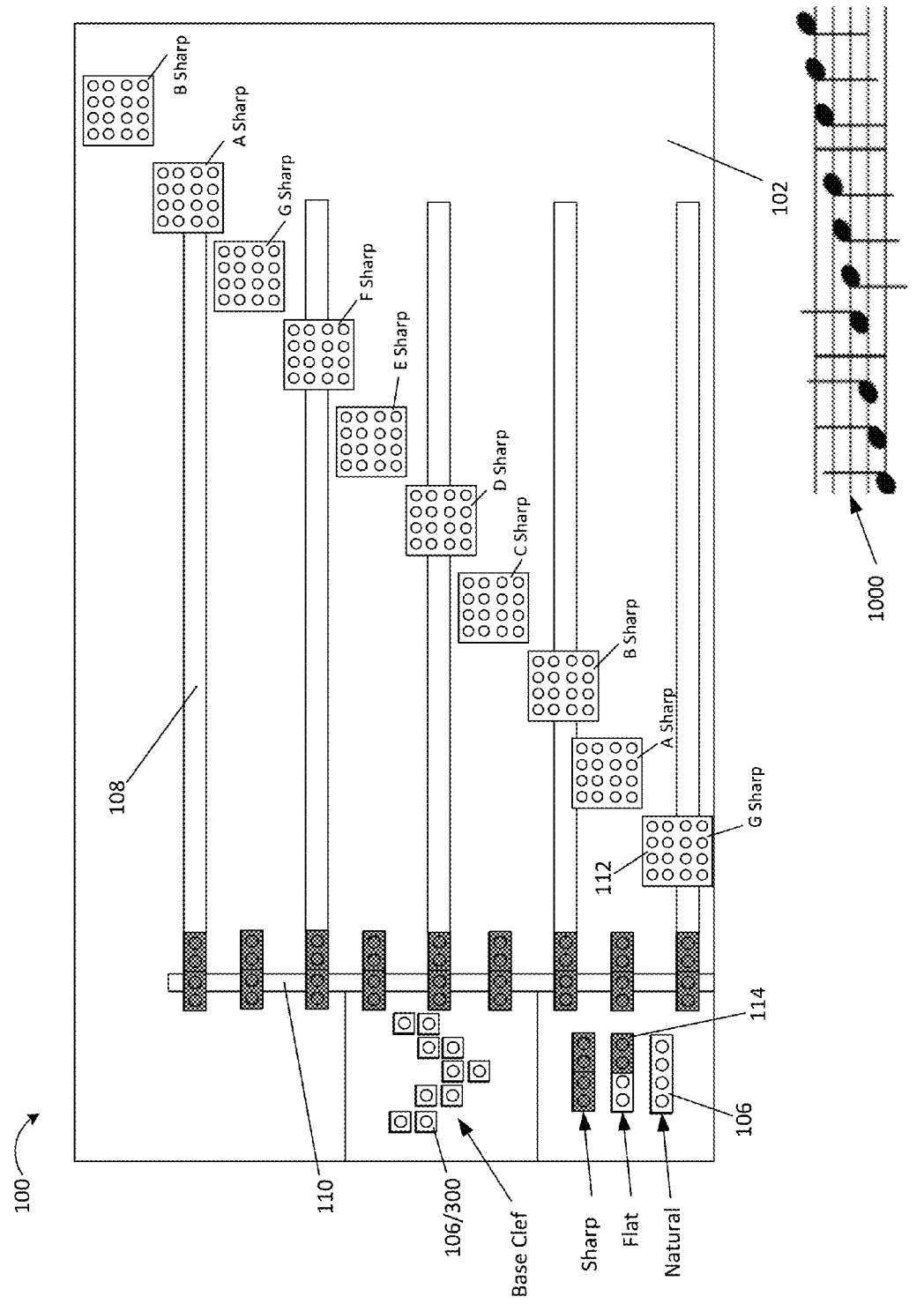
FIGS. 10-13 show plane views of music scales represented by the modular music teaching system in accordance with aspects of the present invention.

FIG. 10 shows a plane view of a music scale represented by the modular music teaching system in accordance with aspects of the present invention. In FIG. 10, the protrusions on the board 102 and the staff lines 108 are not shown for clarity. As shown in FIG. 10, a 1×1 modular block 300 can be attached to the board 102 in the manner shown to represent a base clef. Key signatures can be attached to the board 102 and be represented by a modular block 106 with value blocks 114 attached to the modular block 106. For example, a natural key signature may be represented by a modular block 106 and no value blocks 114 attached. A "Flat" key signature may be represented by a modular block 106 and one value block 114. A "Sharp" key signature may be represented by a modular block 106 and two value blocks 114.

As further shown in FIG. 10, note blocks 112 can be attached to the board 102 and to the staff lines 108 in any manner desired to represent sheet music (e.g., sheet music 1000) interpretable by a visually impaired student. In the example of FIG. 10, a music scale is shown in which music notes are attached to the board 102 and 112 in the manner shown to represent sheet music 1000. In the example of FIG. 10, the key signature is "Sharp," thus the notes represented on the modular music teaching system 100 are "G sharp," "A sharp," "B sharp," "C sharp," "D sharp," "E sharp," "F sharp," "G sharp," "A sharp," and "B sharp" (note that the second instances of "G sharp," "A sharp," and "B sharp" are in a different octave).

Figure 11:
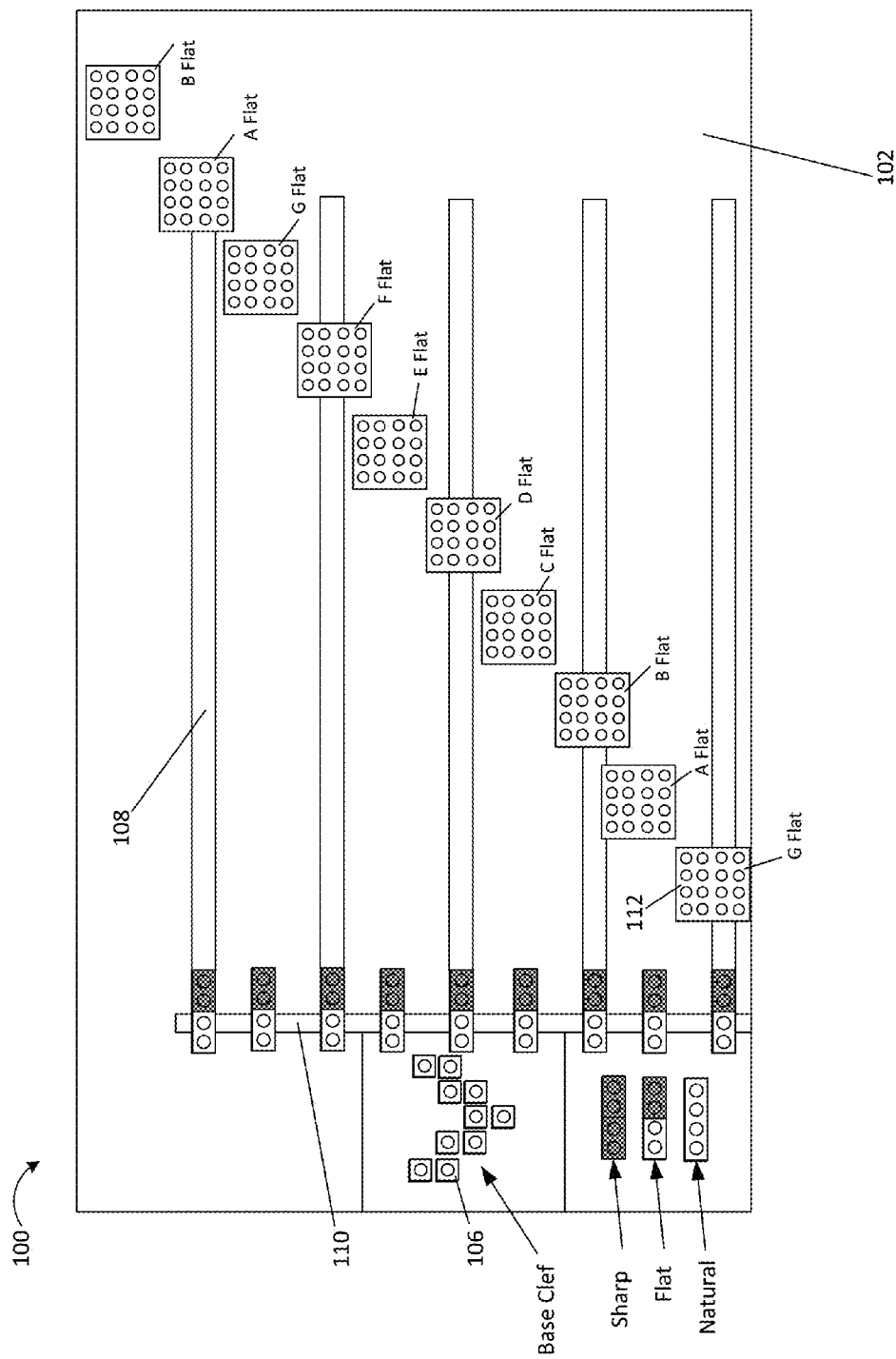

FIG. 11 shows a plane view of a music scale represented by the modular music teaching system in accordance with aspects of the present invention. In FIG. 11, the protrusions on the board 102 and the staff lines 108 are not shown for clarity. FIG. 11 shows a similar example of a representation of a music scale as is shown in FIG. 10, with the difference being the key signature of "Flat." Thus, the notes represented on the modular music teaching system 100 in the example of FIG. 11 are "G flat," "A flat," "B flat," "C flat," "D flat," "E flat," "F flat," "G flat," "A flat," and "B flat" (note that the second instances of "G flat," "A flat," and "B flat" are in a different octave).

Figure 12:
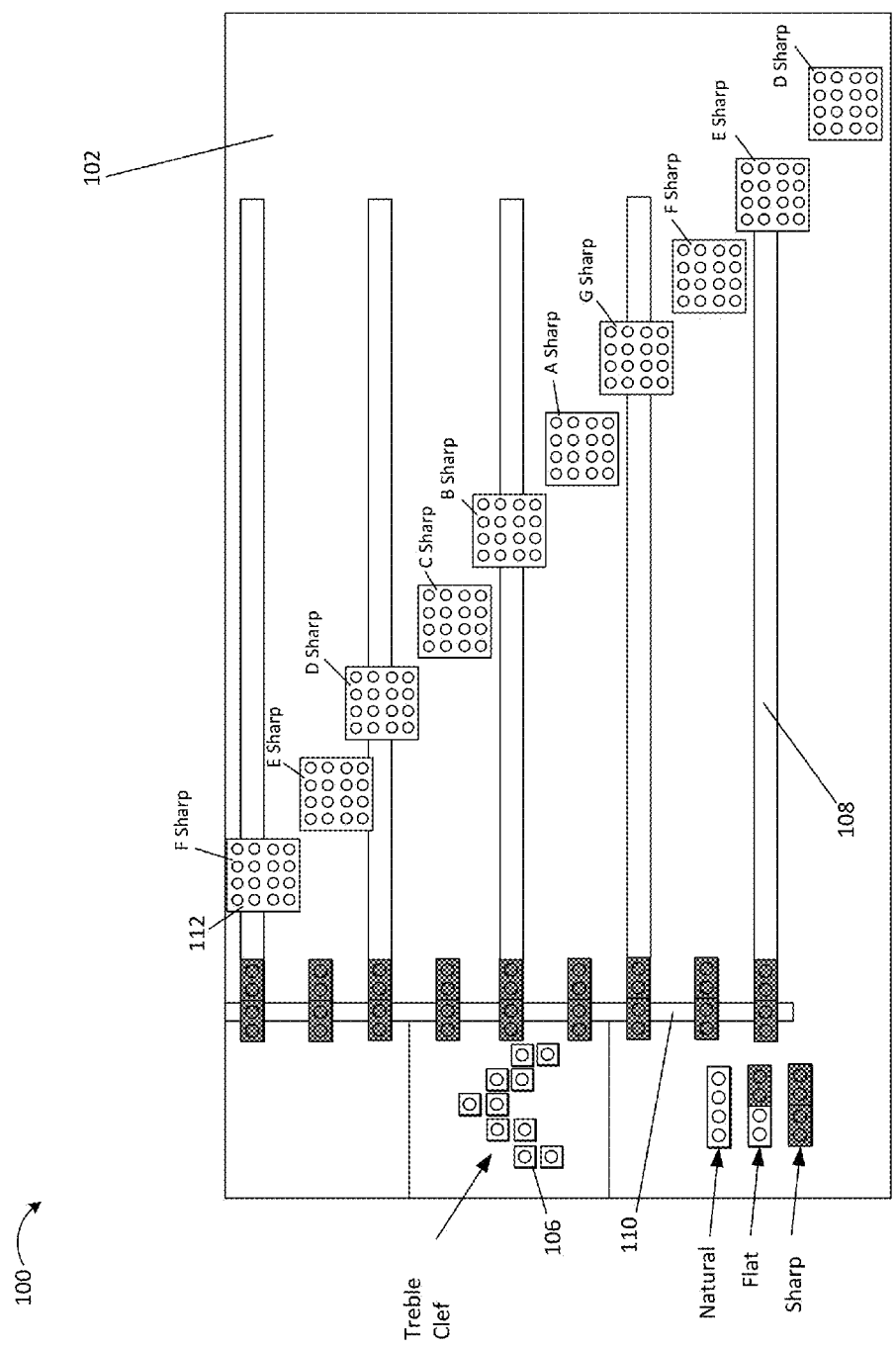

FIG. 12 shows a plane view of a music scale represented by the modular music teaching system in accordance with aspects of the present invention. In FIG. 12, the protrusions on the board 102 and the staff lines 108 are not shown for clarity. FIG. 12 shows a similar example of a representation of a music scale as is shown in FIGS. 10, with the difference being a "Treble" clef as opposed to a "Bass" clef. Thus, the notes represented on the modular music teaching system 100 in the example of FIG. 11 are "F sharp," "E sharp," "D sharp," "C sharp," "B sharp," "A sharp," "G sharp," "F sharp," "E sharp," and "D sharp" (note that the second instances of "F sharp," "E sharp," and "D sharp" are in a different octave).

Figure 13:
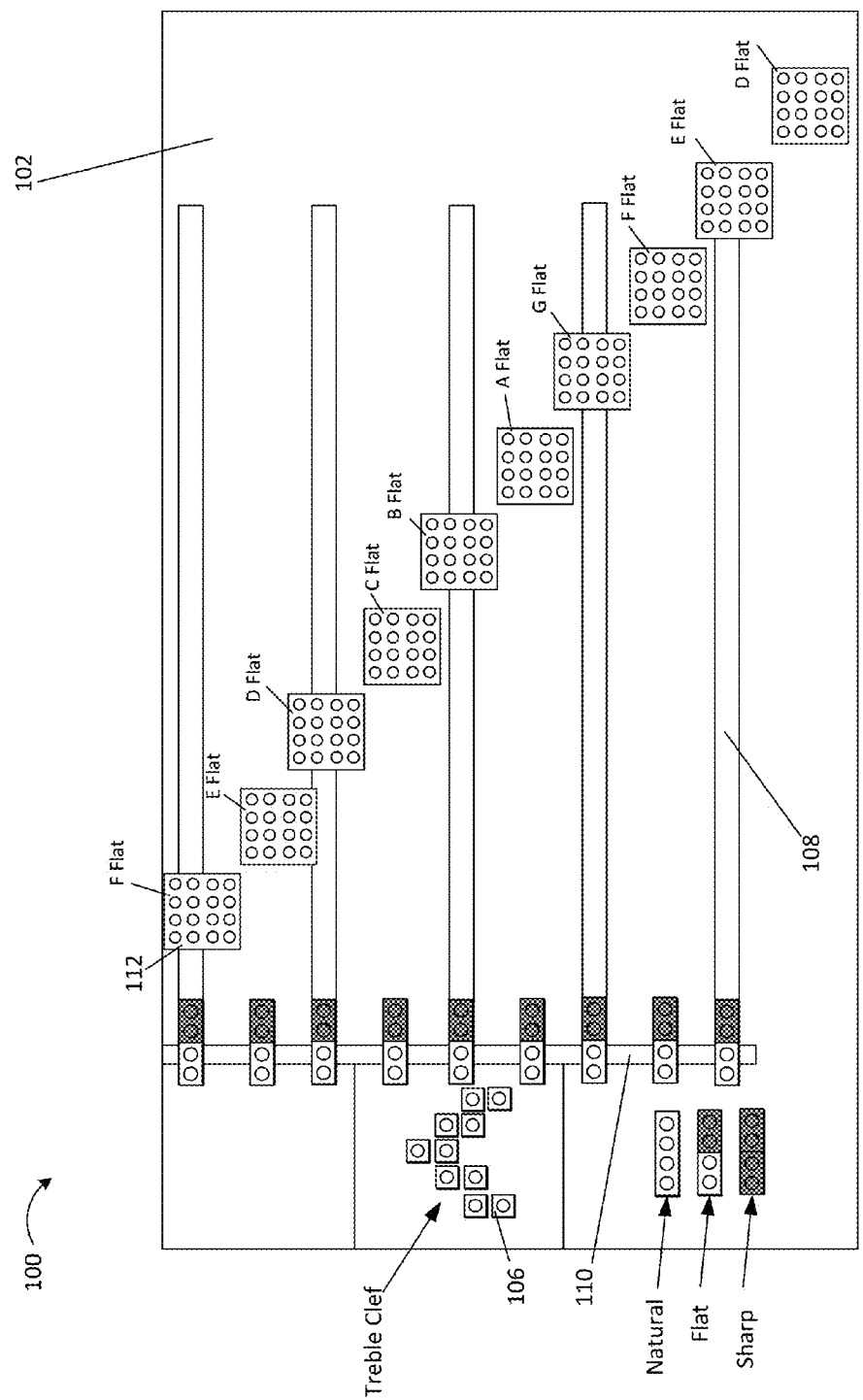

FIG. 13 shows a plane view of a music scale represented by the modular music teaching system in accordance with aspects of the present invention. In FIG. 13, the protrusions on the board 102 and the staff lines 108 are not shown for clarity. FIG. 13 shows a similar example of a representation of a music scale as is shown in FIGS. 12, with the difference being the key signature of "Flat." Thus, the notes represented on the modular music teaching system 100 in the example of FIG. 13 are "F flat," "E flat," "D flat," "C flat," "B flat," "A flat," "G flat," "F flat," "E flat," and "D flat" (note that the second instances of "F flat," "E flat," and "D flat" are in a different octave).

Figure 14A:
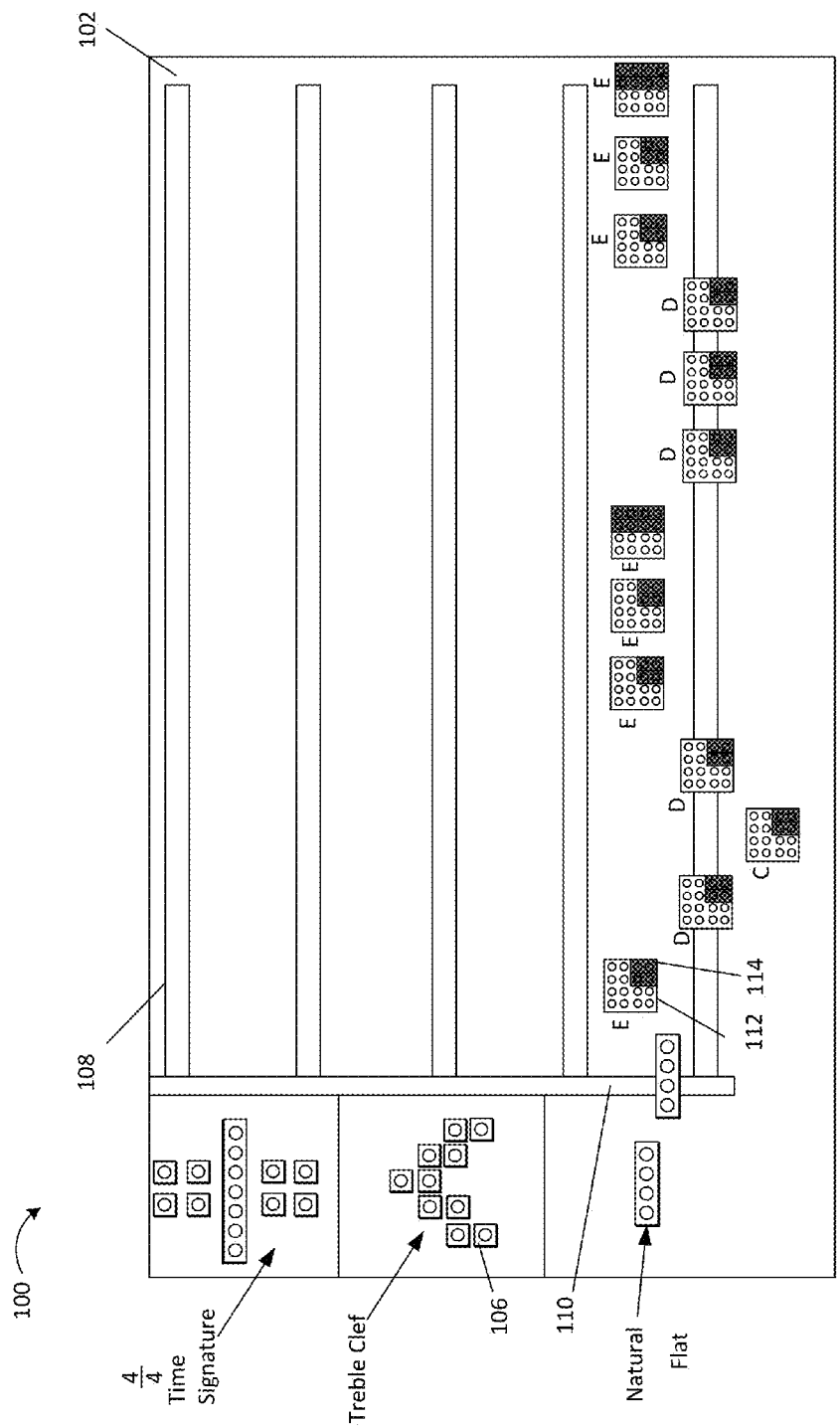
FIGS. 14A and 14B show a plane view of a song represented by the modular music teaching system in accordance with aspects of the present invention.
Figure 14B:
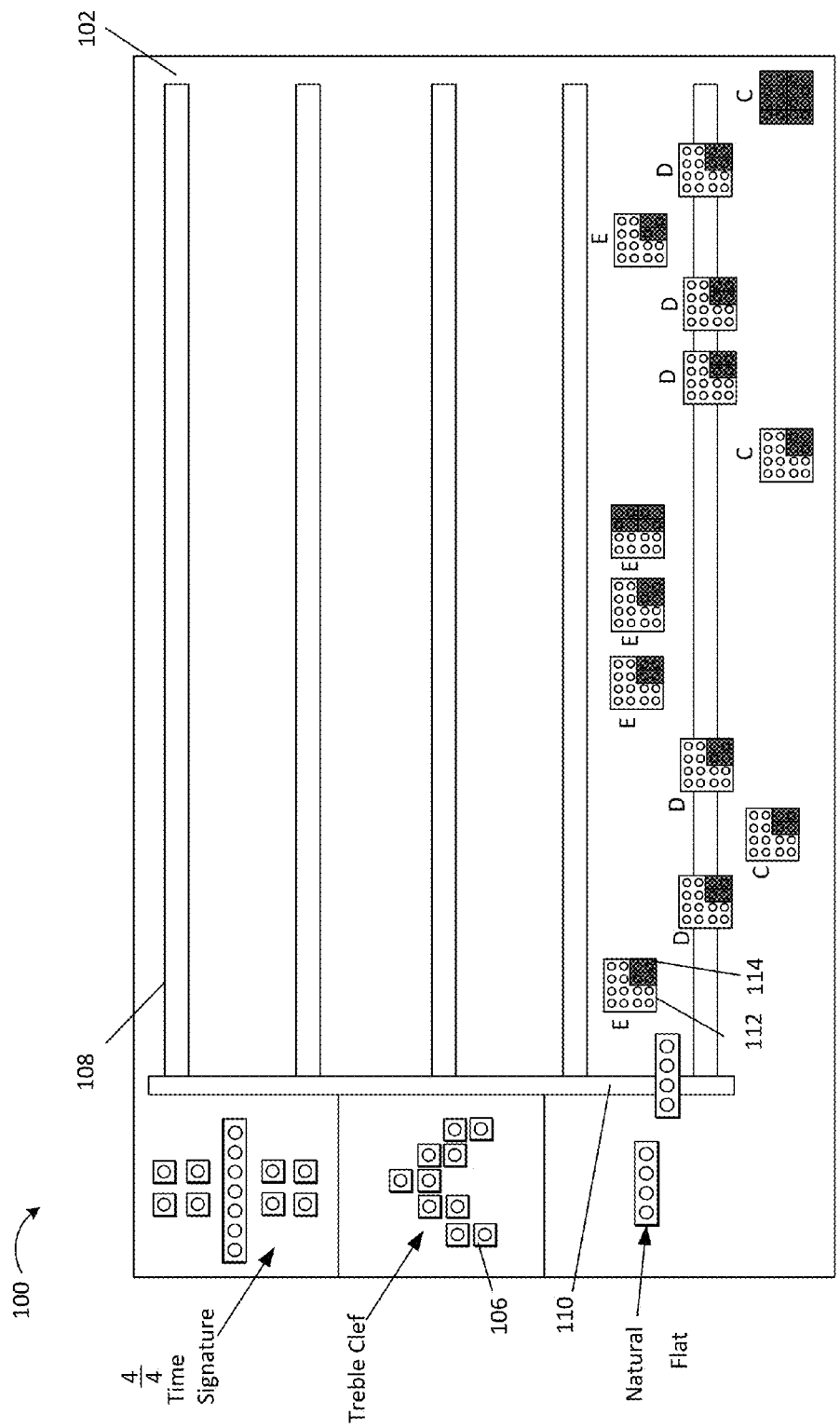

FIGS. 14A and 14B show a plane view of a song represented by the modular music teaching system in accordance with aspects of the present invention. In FIGS. 14A and 14B, protrusions 104 on the board 102 and the staff lines 108 are not shown for clarity. In FIGS. 14A and 14B, modular blocks 106 are arranged on the board 102 and the staff lines 108 to form a time signature, clef, key signature, notes, and note values representing sheet music for the song "Mary Had a Little Lamb." As shown in FIG. 14A, the notes values notes, in sequence are quarter "E", quarter "D", quarter "C", quarter "D", quarter "E", quarter "E", half "E", quarter "D", quarter "D", quarter "D", quarter "E", quarter "E", half "E".

As shown in FIG. 14B, the notes values notes, in sequence are quarter "E", quarter "D", quarter "C", quarter "D", quarter "E", quarter "E", half "E", quarter "C", quarter "D", quarter "D", quarter "E", quarter "D", whole "C". In this way, sheet music is represented using the modular music teaching system 100, thereby permitting a visually impaired student to read and interpret the sheet music.

The systems of the present invention may include instructional material to instruct a teacher or user on how to arrange the modular blocks 106 onto the board 102 in order to form the music teaching system described herein. The systems of the present invention are not limited to the fastening mechanisms described herein. That is, any number and variety of fastening techniques can be used to attach the modular blocks 106 to each other and the board 102. For example, the modular blocks can be attached using snap fasteners, LEGOS®, magnets, or any combination thereof In embodiments, the components of the modular music teaching system 100 can be made from a variety of materials, such as plastic and/or plastic composites.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for representing music to visually impaired students comprising:
    a board having a plurality of protrusions;
    a plurality of modular blocks each having at least one protrusion;
    a plurality of music staff lines formed by a set of the plurality of modular blocks, affixed to the board via the plurality of protrusions on the board; and
    at least one note block affixed to at least one staff line or to the board via protrusions of the at least one staff line or the protrusions of the board.

2. The system of claim 1, further comprising a value block attached to a top surface of the note block, wherein the value block is one of the plurality of modular block.

3. The system of claim 2, wherein the value block forms a depth between a top surface of the note block and a top surface of the value block.

4. The system of claim 2, wherein an indentation is formed between an interface of the value block and the note block.

5. The system of claim 1, further comprising a clef section, a key signature section, and a time signature section formed on the board by the plurality of modular blocks.

6. The system of claim 1, wherein the board, the plurality of blocks, and the staff lines form a three-dimensional representation of sheet music.

7. The system of claim 1, wherein the protrusions are circular protrusions.

8. The system of claim 7, wherein bottoms of the plurality of modular blocks include recesses fixable to the circular protrusions.

9. The system of claim 1, wherein the protrusions are snap fasteners.

* * * * *